United States Patent [19]

Shimizu et al.

[11] Patent Number: 5,065,547
[45] Date of Patent: * Nov. 19, 1991

[54] SURFACE PROCESSING MACHINE FOR HARD DISKS AND THE LIKE

[75] Inventors: Tatsuo Shimizu, Sendai; Kazunori Ozawa, Tomiya; Kenji Yazawa, Shiogama; Kazunori Tani, Machida, all of Japan

[73] Assignee: Speedfam Company, Ltd., Japan

[*] Notice: The portion of the term of this patent subsequent to Nov. 19, 2008 has been disclaimed.

[21] Appl. No.: 362,209

[22] Filed: Jun. 6, 1989

[30] Foreign Application Priority Data

Jun. 6, 1988 [JP] Japan .............................. 63-138610

[51] Int. Cl.⁵ .......................................... B24B 21/02
[52] U.S. Cl. ........................................ 51/154; 51/141; 51/145 R; 51/148; 51/145 T; 51/135 R; 51/150
[58] Field of Search .................... 51/135 R, 154, 155, 51/135 BT, 136, 140, 141, 142, 143, 144, 145 R, 145 T, 146, 148, 149, 150, 151, 152, 281 SF, 328; 360/33.1, 85

[56] References Cited

U.S. PATENT DOCUMENTS

| | | | |
|---|---|---|---|
| 4,347,689 | 9/1982 | Hammond | 51/145 R |
| 4,408,241 | 10/1983 | Ogawa | 360/137 |
| 4,535,567 | 8/1985 | Seaborn | 51/154 |
| 4,671,018 | 6/1987 | Ekhoff | 51/237 T |
| 4,736,475 | 4/1988 | Ekhoff | 51/154 |
| 4,796,115 | 1/1989 | Ohshima et al. | 360/85 |
| 4,796,116 | 1/1989 | Kwon et al. | 360/85 |
| 4,796,387 | 1/1989 | Johnson | 51/150 |
| 4,807,065 | 2/1989 | Kwon | 360/85 |
| 4,855,856 | 8/1989 | Matsuoka | 360/128 |

FOREIGN PATENT DOCUMENTS 136764 6/1986 Japan .................................. 51/140

Primary Examiner—James G. Smith
Assistant Examiner—Blynn Shideler
Attorney, Agent, or Firm—Allegretti & Witcoff, Ltd.

[57] ABSTRACT

A surface processing machine employing a processing tape cartridge for polishing or grinding disks or the like. The machine employs a processing tape cartridge which rotatably accommodates in a casing a pair of reels for the winding of processing tape. The machine comprises a cartridge holder for holding the tape cartridge; a tape drawing mechanism to draw out a portion of the processing tape in the cartridge; a guide roller mechanism for setting and transporting the processing tape on a predetermined path of travel; a work holder mechanism adapted to hold and rotate a work at its machining position; and a tape pressing mechanism for pressing the processing tape against the work.

25 Claims, 5 Drawing Sheets

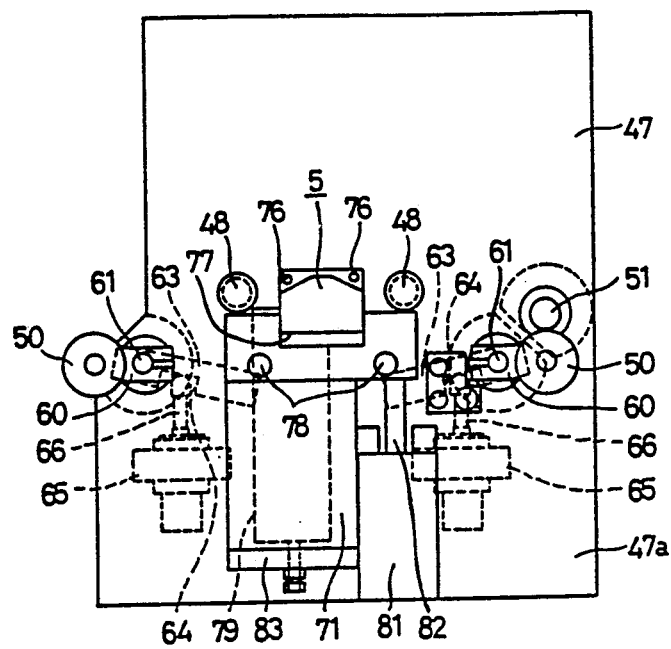
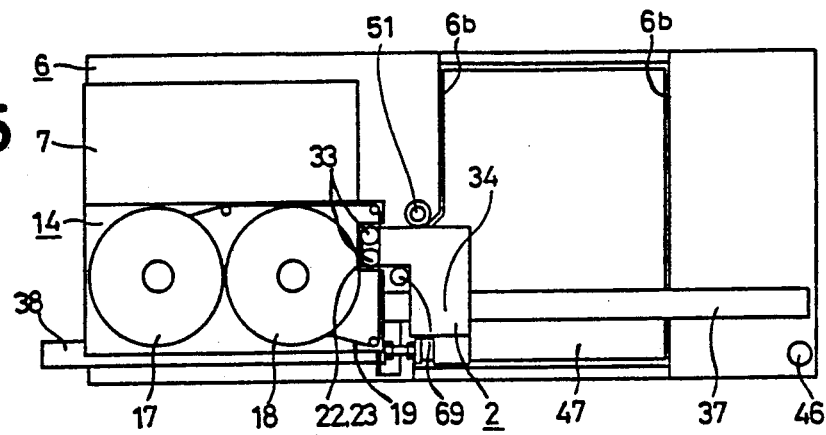
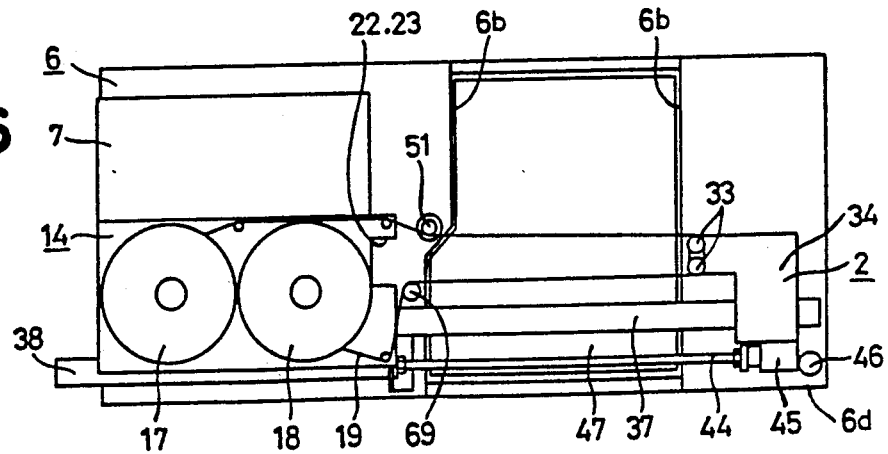

SURFACE PROCESSING MACHINE FOR HARD DISKS AND THE LIKE

BACKGROUND OF THE INVENTION

1. Field of the Invention

This invention relates to a hard disk substrate processing machine useful for treating surfaces of hard disk substrates for magnetic disks or the like.

More specifically, the present invention concerns a grinding/texturing/burnishing/polishing/wiping machine employing a cartridge which accommodates a grinding, texturing, burnishing, polishing or wiping tape for processing the surfaces of hard disk substrates, the machine including a tape drawing mechanism for drawing out the processing tape in the cartridge to a predetermined position on the machine, a substrate holder mechanism for holding and rotating a hard disk substrate, and a tape pressing mechanism for pressing the tape against the hard disk substrate, automatically loading the tape into a predetermined path of travel in a facilitated manner to improve the working efficiency and productivity of the surface treatment operation.

2. Prior Art

As a memory medium for computers, for example, circular magnetic disks which permit random access have been in wide use, and above all the so-called hard disks using a substrate of hard material such as an aluminum alloy, glass sheet, plastics or the like are now in popular use for fixed disks or external disks because of their excellent response and large memory capacity.

The hard disks which have a data recording and reproducing magnetic layer formed, for example, on an aluminum alloy substrate for magnetic disk, are used at a high speed rotation for recording and reproducing information in a multitude of concentric tracks.

In case of magnetic disks of this sort, the substrate surfaces are required to have fine irregularities or certain surface coarseness before formation of the magnetic layer. Namely, the fine surface irregularities are greatly related with the performance quality in travel or motion and durability of the magnetic disks as well as with the improvement of the adhesion of the magnetic layer formed on the substrates.

For forming such fine surface irregularities, there have been introduced various means, including the so-called processing tape having abrasive grains fixed thereon, the dry etching by a bombardment treatment or the like, wet etching etc. Among these, the processing tapes which have a higher processing speed than other means have been generally adopted for forming fine surface irregularities in the circumferential direction of the disks.

When processing magnetic disks by the use of a tape, it has been the conventional practice to set the tape in position by drawing out part of the tape which is simply wound on a reel or the like and threading it manually through and around a large number of guide rollers which are located in predetermined positions on a grinding machine. Then, the tape which is continuously fed from the reel is held in contact with a hard disk substrate which is rotated about its axis, for treating the surface thereof.

In this connection, it has been the general practice to thread the processing tape manually around a large number of guide rollers to set the tape in a predetermined path of travel, but this job is very complicated and time consuming. Besides, the manual tape threading operation often gives rise to the problem of false tape setting, and handling of the tape itself is not easy.

SUMMARY OF THE INVENTION

In view of the foregoing situations, the present invention has as its object the provision of a hard disk substrate treating machine which is capable of setting the processing tape into a predetermined position or a path of travel automatically in a simplified manner, for enhancing the working efficiency and productivity of the surface treatment operation.

In accordance with the present invention, there is provided a hard disk substrate processing machine of the type which employs a processing tape cartridge rotatably accommodating in a rectangular casing a pair of reels carrying a winding of processing tape thereon, the processing machine including: a cartridge holder for holding the processing tape cartridge fixedly in position on the machine; a tape drawing mechanism for drawing out part of the processing tape in the cartridge to a predetermined position; a guide roller mechanism for setting a drawn-out portion of the processing tape in a predetermined path of travel through a machining position; a disk holder mechanism adapted to hold and rotate a hard disk substrate at the machining position; and a tape pressing mechanism for pressing the processing tape against a surface of the hard disk substrate.

Upon setting the processing tape cartridge on the hard disk substrate processing machine, the processing tape in the cartridge is drawn out automatically to a predetermined position by the tape drawing mechanism. Then, the processing tape is pressed against the surface of a hard disk substrate by the tape pressing mechanism. Simultaneously, the hard disk substrate which is mounted on the disk holder mechanism is thereby rotated about its axis. Thus, the hard disk substrate undergoes a treatment in the known manner by the processing tape which is in pressed contact with the substrate surface.

The above and other objects, features and advantages of the invention will become apparent from the following description and the appended claims, taken in conjunction with the accompanying drawings which show by way of example a preferred embodiment of the invention.

BRIEF DESCRIPTION OF THE DRAWINGS

In the accompanying drawings:

FIG. 4 is a plan view of a guide roller unit section;

FIG. 5 is a schematic plan view of a cartridge mounted in position on the processing machine;

FIG. 6 is a schematic plan view of a processing tape drawn out of the cartridge;

DESCRIPTION OF PREFERRED EMBODIMENTS

Figure 1:
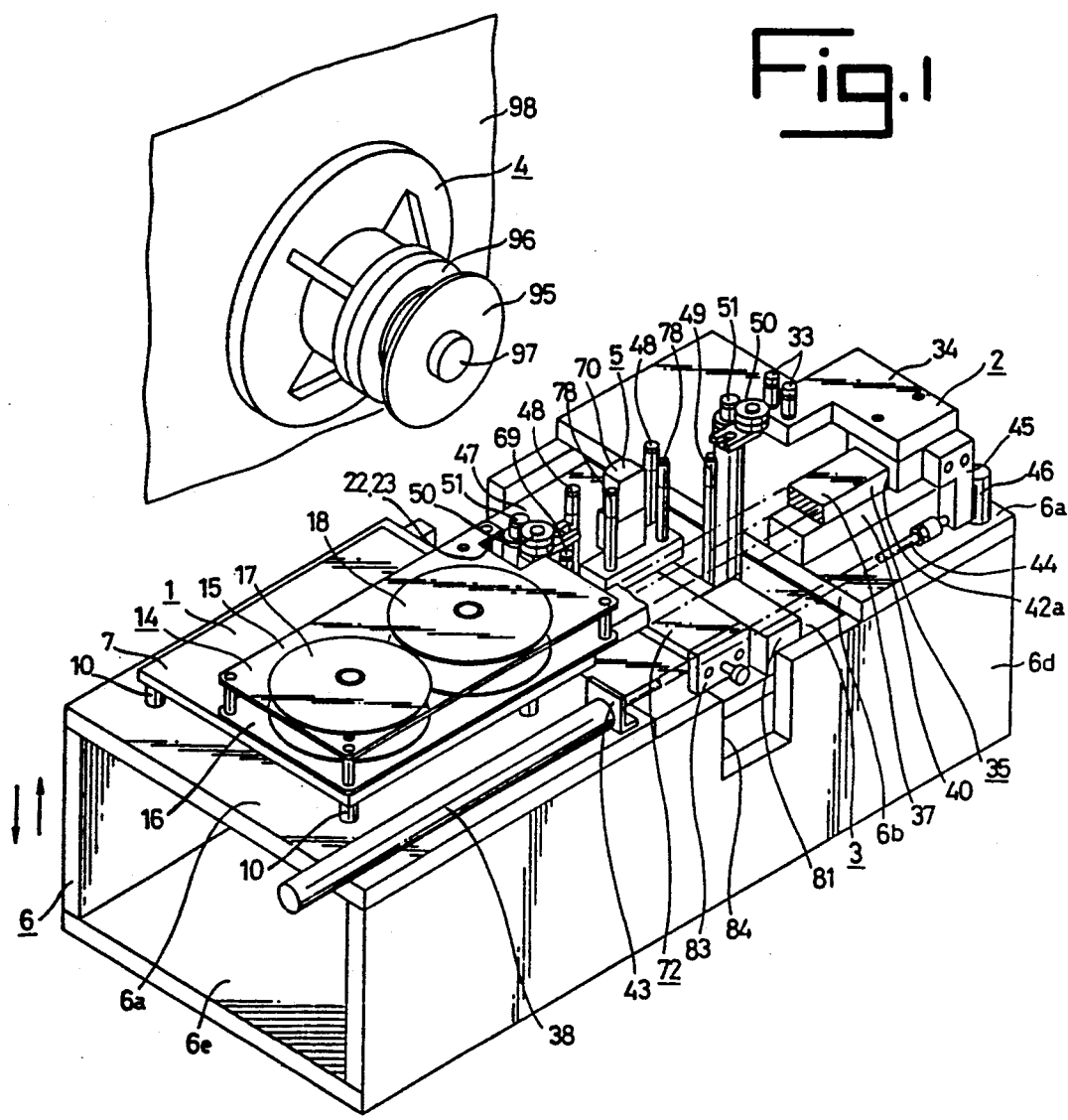
FIG. 1 is a perspective view of a hard disk substrate processing machine incorporating the present invention.

Now, the invention is described more particularly by way of a preferred embodiment shown in the drawings.

As illustrated in FIGS. 1 through 4, the hard disk substrate processing machine according to the invention is mainly constituted by: a cartridge mount section 1 for mounting a cartridge which packages a pair of reels with a processing tape in a generally rectangular casing; a tape drawing mechanism 2 for drawing out part of the processing tape in the cartridge to a predetermined position; a guide roller mechanism 3 for setting the drawn-out processing tape in a predetermined path of travel extending through a machining position; a substrate holder mechanism 4 for holding and rotating a hard disk substrate to be machined; and a tape pressing mechanism 5 for pressing the processing tape against the hard disk substrate.

In this instance, the cartridge mount section 1 and the tape drawing mechanism 2 are mounted on a main surface 6a of a rectangular housing 6. The guide roller mechanism 3 is received in an opening 6b which is provided in a center portion of the housing 6, for upward and downward movements therein. Further, the tape pressing mechanism 5 is supported on the guide roller unit section 3. The substrate holder mechanism 4 which holds and rotates a substrate is mounted on a base plate, opposingly to a machining position in a center portion of the main surface 6a of the housing 6.

The cartridge mount section 1 includes a cartridge mount plate 7 which supports thereon a processing tape cartridge, pins 8 which hold the cartridge in a predetermined position, and a pair of hub drive shafts 9 which are engageable with the hubs of tape reels in the cartridge for rotating same.

The cartridge mount plate 7 is of a plate-like form and fixedly mounted on the main surface 6a of the housing 6 through support posts 10 of a predetermined length. Consequently, the travel position of the lapping tape from the cartridge is determined by the support posts 10. Namely, the processing tape travels at a position spaced from the main surface 6a of the housing 6. Further, positioning pins 8 which hold the cartridge in a predetermined position are fixed to the cartridge mount plate 7 by means of bolts or other suitable fixing means. On the other hand, the cartridge is provided with positioning holes into which the positioning pins 8 are fitted to hold the cartridge fast in position on the cartridge mount plate 7.

The hub drive shafts 9 are provided with bladed portions 11 which are meshingly engageable with hub portions of the tape reels, rotational shafts 12 which rotate the bladed portions 11, and hollow support columns 13 which receive the rotational shafts 12 therein. The support columns 13 are held in position through bores which are formed into the main surface 6a of the housing 6, and securely fixed by bolts or other suitable means to the rear surface 6c of the housing on the opposite side of the main surface 6a. The rotational shafts 12 are rotatably received in the support columns 13, with the bladed portions 11 attached to the upper ends of the respective rotational shafts 12 for rotation with the latter. The bladed portions 11 are projected above a cartridge mount surface 7a for engaging with the tape reels of the cartridge. On the other hand, the other end of each rotational shaft 12, remote from the end with the bladed portion 11, is protruded into the housing 6 and coupled, for example, with a drive unit like a motor (not shown) for rotating the bladed portion 11.

In this case, the cartridge 14 which is placed on the cartridge mount surface 7a consists of upper and lower halves 15 and 16 which are joined together face-to-face through a number of spacing support columns 26, and a pair of reels 17 and 18 which are rotatably accommodated between the upper and lower halves 15 and 16 of the cartridge casing. A processing tape 19 is passed between and wound on these tape reels 17 and 18 in the manner as shown in the drawings.

The upper and lower halves 15 and 16 rotatably accommodate the reels 17 and 18 which have the processing tape wound thereon, and are formed by molding a synthetic resin material or the like into a rectangular shape in plan view. The upper and lower halves 15 and 16 are provided with bores 20 and 21 in predetermined spaced positions, which permit rotational movements of the paired tape reels 17 and 18 therein. Further, at one of their short sides, the upper and lower cartridge halves 15 and 16 are formed with notches or indented portions 22 and 23, respectively, to receive therein a couple of loading rollers as will be described hereinlater. These notches or indented portions 22 and 23 are formed by cutting off part of the upper and lower halves 15 and 16 to prevent the loading roller from hitting against the cartridge. The upper and lower halves are further provided with positioning holes 24 or 25 one in a position close to the notch 22 or 23 and the other in a diagonally opposite position, the positioning holes 24 and 25 being fittingly engageable with the positioning pins 8 which are projected on the cartridge mount surface 7a. Thus, upon inserting positioning pins 8 into the positioning holes 25 in the lower half 16, the cartridge 14 is fixedly held in position on the cartridge mount plate 7.

The upper and lower halves 15 and 16 which are formed in the above-described manner are abuttingly joined together by bolts through cylindrical spacer columns 26 of a predetermined length. The paired tape reels 17 and 18 which are accommodated between the upper and lower cartridge halves 15 and 16 are provided with upper and lower flanges 29 or 30 and 31 or 32 in positions proximate to the opposite ends of the hub portions 27 and 28 for winding the lapping tape regularly on the hub portions 27 and 28 at the respective center axes.

The hub portions 27 and 28 are axially provided with bladed portion insert holes 27a and 28a which are engageable with the bladed portions 11 of the hub drive shafts 9. Projections 27b and 28b are provided at the opposite ends of the hub portions 27 and 28, respectively, in such a manner that they project slightly outward from the faces of the upper and lower flanges 29 (30) and 31 (32). These projections 27b and 28b fit in the bores 20 and 21 in the upper and lower cartridge halves 15 and 16, so that the tape reels 17 and 18 are freely rotatable in the cartridge 14.

Of the above-described paired tape reels 17 and 18, the one which is located on the side of the notches 22 and 23 in the upper and lower halves 15 and 16 serves as a supply reel while the other one on the opposite side serves as a take-up reel.

The lapping tape 19 which is wound on and between the paired tape reels 17 and 18 is led out of the supply reel 18 and passed around the outer sides of the support columns 26, which are located on the opposite sides of the notches 22 and 23 in parallel relation with each other, and wound on the take-up reel 17 around a support column 26 which is located substantially at a median position of the upper and lower halves 15 and 16. Accordingly, the lapping tape 19 from the supply reel 18 is passed along the outer side of the notches 22 and 23 before it is wound on the take-up reel 17. The lapping tape 19 has abrasive grains securely fixed on one side thereof for grinding surfaces of hard disk substrates, for example, surfaces of substrates for magnetic disks or the like.

When a lapping tape to be used for a grinding treatment is packaged in the form of a cartridge having the tape on a pair of reels in the above-described manner, the handling of the lapping tape itself becomes extremely easy. For instance, the tape which has been used for a grinding treatment can be removed from the machine without touching the contaminated tape surfaces with hands, coupled with an advantage of simplified storage and administration of lapping tapes.

The tape drawing mechanism 2 includes loading rollers 33 which serve to pull out and transport the tape, a loading roller mount plate 34 for supporting the loading rollers 33, and sliding means 35 for sliding the loading roller mount plate 34.

The loading rollers 33 are mounted on support shafts 36 and are respectively rotatable about the axes of the latter. The support shafts 36 are fixed to the loading roller mount plate 34.

The fore end portion of the plate 34, on which the loading rollers 33 are mounted, is movable into the notches 22 and 23 in the cartridge 14, and, for this purpose, is formed in a width smaller than that of the notches 22 and 23. Also, the loading roller mount plate 34 is formed in an angular shape as a whole to avoid collision against the third guide roller 69 which is located on the main surface 6a of the housing 6.

The loading roller sliding means 35 includes a guide rail 37 which slidably supports the loading roller mount plate 34, and a cylinder member 38 which moves the loading rollers 33 to a predetermined position.

The guide rail 37 is constituted by an elongated strip with a predetermined width, and fixedly mounted on the main surface 6a of the housing 6 in the longitudinal direction thereof. More specifically, the fore end portion of the guide rail 37, which is located close to the cartridge mount plate 7, is fixed through a cylindrical member 39 of a predetermined height, while the other end is fixed through a support block 40 of the same height as the cylindrical member 39.

The loading roller mount plate 34 is mounted on the guide rail 37 in such a way that it is able to slide. More specifically, a height adjusting plate 41 is attached to the lower side of the loading roller mount plate 34 to hold the loading rollers at the tape travelling level, and a sliding base plate 42 which is in engagement with and slidable along the guide rail 37 is attached to the height adjusting plate 41. The sliding base plate 42 is provided with a guide groove 42a which is slightly greater in width than the guide rail 37 for engagement therewith. Consequently, the loading roller mount plate 34 is slidable along the guide rail 37 toward and away from the cartridge.

The cylinder member 38 which moves the loading roller mount plate 34 to a predetermined position is mounted in the longitudinal direction of the cartridge mount plate 7. Namely, the cylinder 38 is securely mounted on the main surface 6a of the housing 6 by a bracket 43. As the cylinder 38, there may be employed an ordinary air cylinder or the like.

The fore end of rod 44 of the cylinder 38 is fixedly attached to a rod connecting member 45 which is fixed on one side of the height adjusting plate 41. Accordingly, as soon as air is supplied to the cylinder 38, the rod 44 is pushed out of the cylinder, pressing the rod connecting member 45. Whereupon, the loading roller mount plate 34 is slid along the guide rail 37 in a direction such that the processing tape is pulled out. Conversely, when air is drawn out of the cylinder 38, the rod 44 is retracted into the cylinder 38 to pull the rod connecting member 45 toward the cartridge. As a result, the loading roller mount plate 34 is moved toward the cartridge mount plate 7, sliding along the guide rail 37.

In this instance, a loading roller positioning member 46 is provided on the main surface 6a of the housing 6 in a position proximate to the other end of the guide rail 37 to stop the loading rollers 33 in a predetermined position. Namely, the loading roller positioning member 46 is located such that the loading rollers 33 take the predetermined position when the rod connecting member 45 comes into engagement with the loading roller positioning member 46.

The provision of the loading roller positioning member 46 prevents the loading roller mount plate 34 from derailing from the guide rail 37 when pushed by the rod 44. On the other hand, when the loading roller mount plate 34 is slided toward the cartridge mount plate 7, it is stopped as soon as its fore end portion comes into engagement with the fore end face of the cartridge mount plate 7.

The guide roller mechanism 3 includes a group of guide rollers for transporting the lapping tape 19, and a guide roller mount plate 47 for supporting the guide rollers.

The above-mentioned group of guide rollers is mainly composed of first guide rollers 48, second guide rollers 49, pinch rollers 50 and capstans 51, which are mounted in predetermined positions on the main surface 47a of the guide roller mount plate 47.

The first guide rollers 48 are located in positions with a predetermined interval therebetween, substantially in a middle portion of the guide roller mount plate 47, namely, in positions close to the grinding position where the hard disk substrate is to be machined. The first guide rollers 48 are rotatably mounted on roller shafts 53 provided at the upper ends of the posts 52 which are fixed on the guide roller mount plate 47. The length of the posts 52 are so determined that the first guide rollers 48 will come into level with the tape travel position when the guide roller mount plate 47 is moved to a raised position.

The capstan 51 for feeding the tape is located on the tape drawing side and in a position closer to the guide rail 37 of the tape drawing mechanism 2 than the first guide rollers 48. The capstan 51 is provided with a roller portion 54 which pinches and drives the tape in cooperation with the pinch roller 50, a roller drive shaft 55 which rotates the roller portion 54, and a support column 56 which receives the roller drive shaft 55 therein. The support column 56 is located in a hole which is bored into the guide roller mount plate 47, and securely fixed by bolts to the rear surface 47b on the opposite side of the main surface 47a of the guide roller mount plate 47. The roller portion 54 is attached to the fore end of the roller drive shaft 55 which is received in the support column 56, and rotated with the roller drive shaft 55. The other end of the roller drive shaft 55, remote from the roller portion 54, is protruded into the housing 6 and coupled with a drive unit (not shown) which is mounted in the housing 6 for rotating the roller portion 54. Similarly to the first guide roller 48, the length of the support column 56 of the capstan 51 is determined such that the roller portion 54 will come into a position in level with the afore-mentioned tape travel position when the guide roller mount plate 47 is moved to the raised position.

A second capstan 51 identical with the above-described capstan 51 is provided on the main surface 6a of the housing 6 in a position in line with the first capstan 51 in the longitudinal direction of the housing 6. This second capstan 51 has its support column 56 located in a hole bored in the housing 6 and securely fixed to the main surface 6a of the housing 6 by bolts or other suitable means. Similarly, the inner end of the roller drive shaft 55 of the second capstan 51 is coupled with a drive unit like a motor (not shown) which is mounted in the housing for rotating the roller portion 54.

The pinch rollers each 50 include a pinch roller portion 58 which is pressed against the roller portion 54 of the opposing capstan 51 for rotation with the latter, a roller shaft 59 which supports the pinch roller portion 58, an arm portion 60 which supports the pinch roller portion 58 and the roller shaft 59, a roller drive shaft 61 for rocking the arm portion 60, and a support column 62 which accommodates the roller drive shaft 61.

The pinch roller portion 58 which holds and transports the lapping tape in cooperation with the roller portion 54 of the capstan 51 is formed of rubber or the like, and supported on the roller shaft 59. The roller shaft 59 is planted on the arm portion 60 which is fixedly mounted at the outer end of the roller drive shaft 61. The roller drive shaft 61 is received in the support column 62 which is located in a hole bored in the guide roller mount plate 47 and securely fixed by bolts or other suitable means to the rear side of the guide roller mount plate 47.

As shown in FIG. 4, the inner end of the roller drive shaft 61 (which is located away from the arm portion 60 or which is protruded into the housing 6 through the guide roller mount plate 47) supports a rotary plate 63 which is rotated integrally with the roller drive shaft 61. The rotary plate 63 is in the form of a flat plate with a notch or an indented portion 64 which is engageable with rod 66 of a pinch roller shifting means 65 like an air cylinder which moves the pinch roller portion 58 into the notch 64.

Upon operating the pinch roller actuator 65 (see FIG. 4), the rod 66 of the actuator 65 is pushed out to engage the notch 64 in the rotary plate 63, and, as the rod 66 is poked out, the rotary plate 63 is turned about the roller drive shaft 61. As a result, the pinch roller 58 is swung away from the capstan 51. In this instance, the pinch roller portion 58 is constantly pressed against the roller portion 54.

When the guide roller mount plate 47 is raised into the operating position, the pinch rollers 50 are also lifted to a position in level with the tape travel position.

The second guide roller 49 (FIG. 3) is located in a position proximate to the pinch roller 50 on the tape drawing side, and rotatably supported on a roller shaft 67a which is provided at the outer end of a support column 67. The support column 67 is planted on a guide roller mount member 68 which is fixed on the main surface 47a of the guide roller mount plate 47. Similarly, the second guide roller 49 is lifted to a position level with the tape travel position when the guide roller mount plate 47 is raised to the upper operating position.

A third guide roller 69 which serves to guide the lapping tape into a predetermined position similarly to the above-described second guide roller 49 is provided on the main surface 6a of the housing 6 in a position closer to the guide rail 37 of the tape drawing mechanism 2 as compared with the second guide roller 49. The third guide roller 69 is mounted on the housing 6 in level with the tape travel position.

The tape pressing mechanism 5 (see FIG. 1) includes a tape pressing member 70 which presses the lapping tape 19 against a hard disk substrate, a mount plate 71 which mounts the pressing member 70 thereon, and a slider portion 72 for sliding the mount plate 70.

The tape pressing member 70 is provided with a pressing portion 73 (see FIG. 3) of a cubic form which serves to press the lapping tape 19 against the surface of a hard disk substrate, and a base portion 74 attached to the mount plate 71. The pressing portion 73 has a guide pin mount portion 75 cut out at its fore end to plant a pair of guide pins 76 thereon (see FIG. 7). The guide pins 76 are positioned parallel with each other to press the lapping tape 19 uniformly against the surface of a hard disk substrate. Thus, the surface of hard disk substrate is ground by the lapping tape portions travelling between these guide pins 76.

Figure 2:
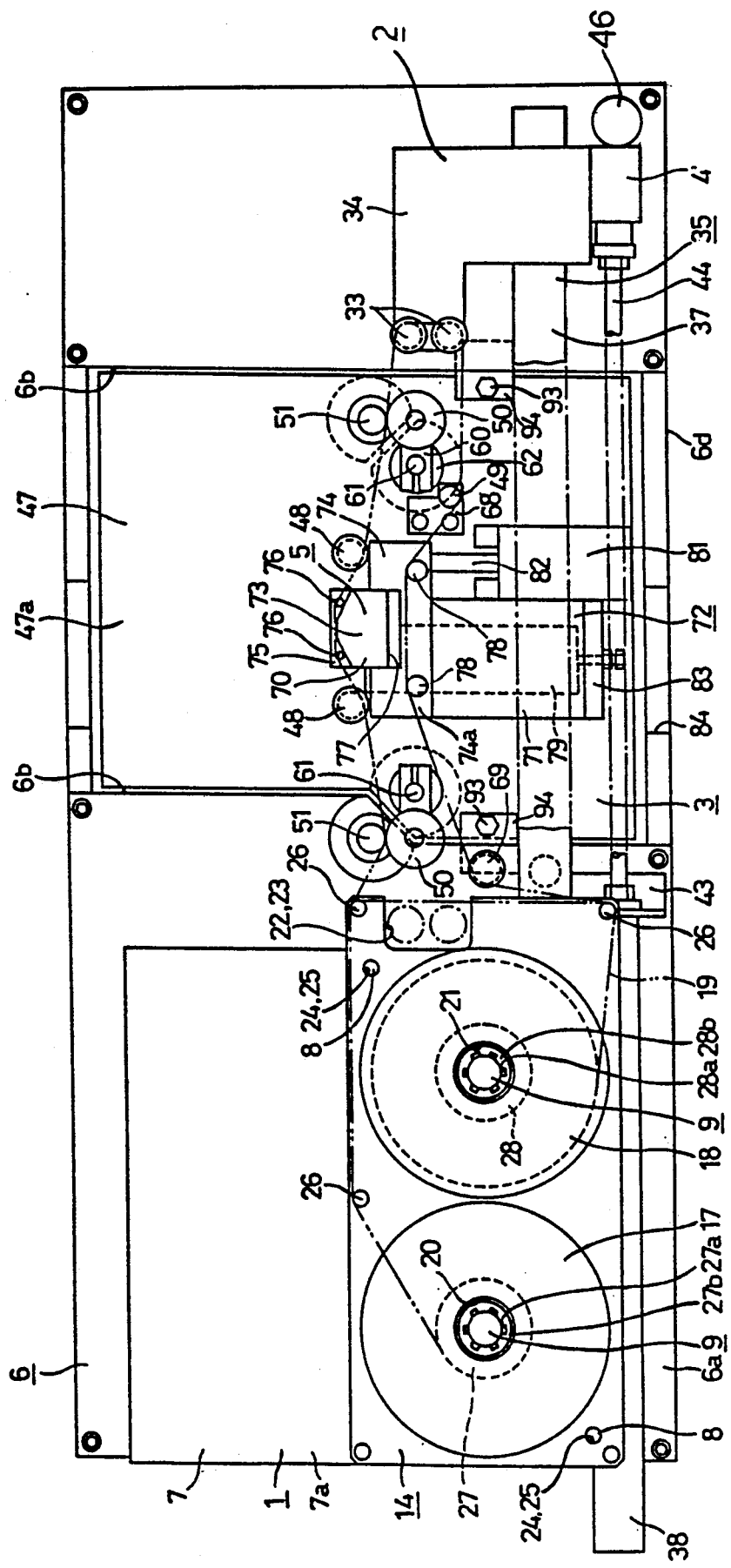
FIG. 2 is a plan view of the processing machine.

The pressing portion 73 is provided with air holes (not shown) for pressing the lapping tape 19 against the surface of hard disk substrate by the action of air blast of a predetermined pressure, which is blown out through the air holes in a direction perpendicular to the lapping tape portions travelling between the guide pins 76 (see FIG. 2). On the side remote from the guide pin mount portion 75, the pressing portion 73 is provided with an indented tape escape portion 77 (FIG. 2) to prevent its contact with the travelling lapping tape.

The pressing portion 73 is fixed on the top surface 74 of the above-mentioned base portion 74 on which guide pins 78 are also planted to guide the lapping tape 19 into a predetermined position. The base portion 74 is securely fixed on the mounting plate 71, which mounting plate 71 is in turn mounted on the slider portion 72 on the guide roller mounting plate 47.

Figure 3:
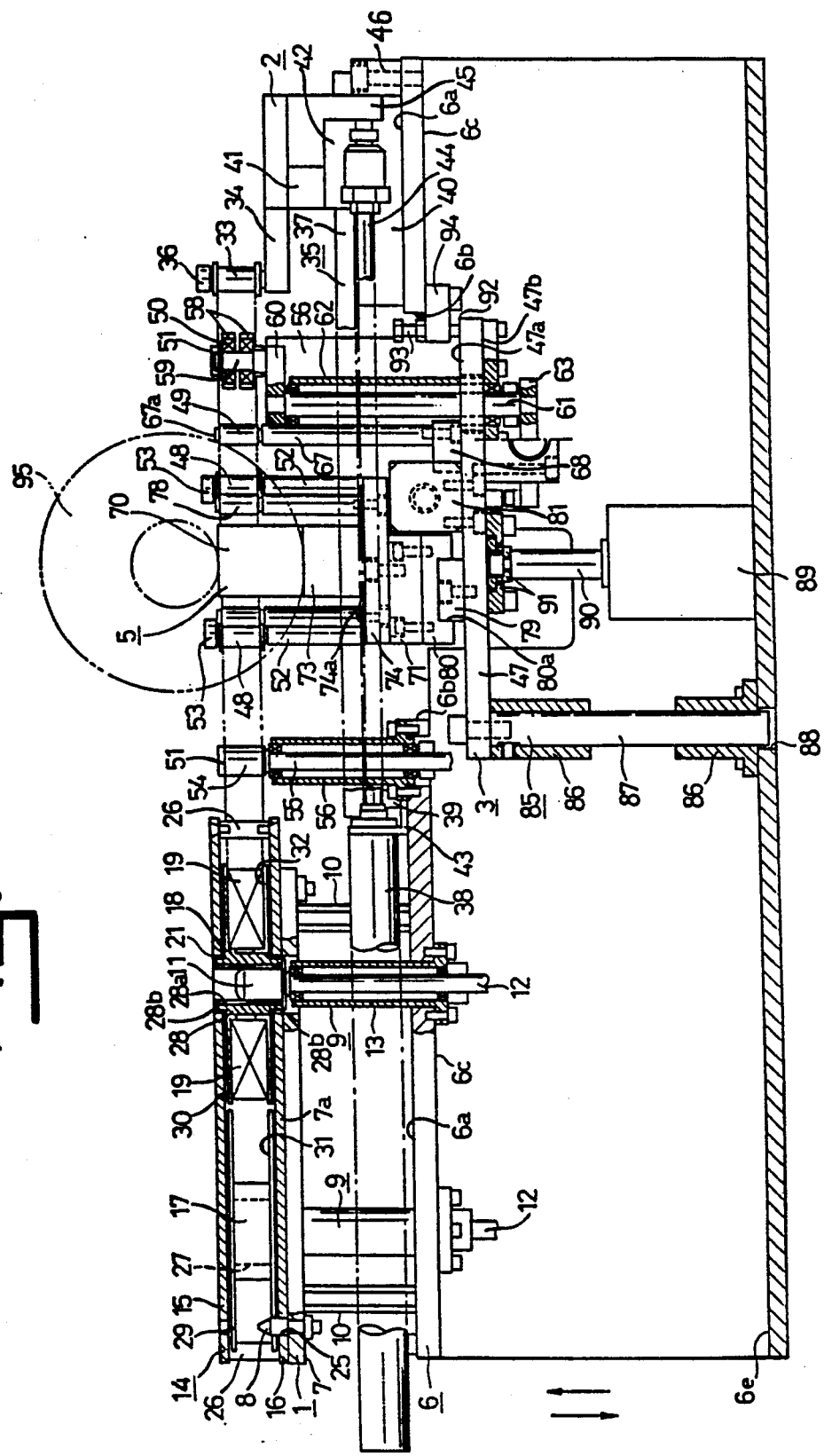
FIG. 3 is partly sectioned side view of the processing machine.

As shown in FIG. 3, the slider portion 72 includes a guide rail 79, a slider plate 80 which is engaged with the guide rail 79, and an actuator cylinder 81 which moves the slider plate 80.

The guide rail 79 consists of an elongated strip of a predetermined width and laid in a direction perpendicular to the direction of tape travel. The slider plate 80 which is in engagement with the guide rail 79 is provided with a guide groove 80a of a width slightly greater than that of the guide rail 79 for engagement therewith. Thus, the slider plate 80 will slide on and along the guide rail 79.

The cylinder portion 81 which moves the slider plate 80 normally consists of an ordinary air cylinder or the like, and is mounted in parallel fashion with respect to the guide rail 79. The fore end of rod 82 of the cylinder portion 81 is attached to the mount plate 71 of the tape pressing member 70. Accordingly, upon supplying air to the air cylinder, the rod 82 is pushed out from the cylinder 81 to press the mount plate 71. Whereupon, the slider plate 80 is caused to slide along the guide rail 79, advancing in a direction perpendicular to the direction of tape travel. On the contrary, if air is drawn out of the cylinder 81, the rod 82 is retracted into the cylinder 81, pulling the mount plate 71 thereto. This causes the slider plate 80 to slide along the guide rail 79 and to move toward one longitudinal side surface 6d of the housing 6. Thus, the tape pressing member 70 on the slider plate 80 becomes slidable in a direction perpendicular to the path of the lapping tape.

On the other hand, a stopper plate 83 is attached to an end face of the mount plate 71 on the side away from the above-mentioned grinding position, thereby to stop the tape pressing member 70 in a predetermined position. Namely, the tape pressing member 70 assumes the predetermined position when the stopper plate 83 comes into engagement with the end face of the guide rail 79. Further, for preventing collision of the tape pressing mechanism 5 against the housing 6, a notch 84 of U-shape in section is provided in the side wall 6d of the housing 6 at a position confronting the stopper plate 83.

In this instance, the guide roller mount plate 47 which mounts the respective guide rollers and the tape pressing mechanism 5 is movable up and down within the opening 6b of the housing 6.

The guide roller mount plate 47 is supported by a slide post 85 which is provided on the bottom wall 6c of the housing 6. The slide post 85 includes guide bushes 86 and a guide post 87 which is movable up and down under guidance of the bushes 86. One of the bushes 86 is fixed on the bottom wall 6c of the housing 6, while the other one which is provided on the side of the guide roller mount plate 47 is securely fixed to the guide post 87 by a bolt or other suitable means. The guide post 87 is movable up and down in the guide bushes 86, and is connected to the guide roller mount plate 47. Therefore, the guide roller mount plate 47 is movable up and down with the slide post 85. A post escape hole 88 is provided in the bottom wall 6c of the housing 6 in alignment with the guide post 87.

As shown in FIG. 3, the guide roller mount plate 47 is supported on a cylinder 89 which moves the mount plate 47 up and down within the opening 6b of the housing 6. More specifically, the cylinder 89 is fixed on the bottom wall 6c of the housing 6, and has the fore end of its rod 90 fixed to the lower side 47b of the guide roller mount plate 47. The rod 90 is fixed to the lower side 47b of the guide roller mount plate 47. The rod 90 is fixed to the guide roller mount plate 47 through a connecting member 91. Therefore, as soon as air is fed to the cylinder 89, the rod 90 is projected to push up the guide roller mount plate 47. Consequently, the guide roller mount plate 47 is lifted up toward the opening 6b of the housing 6 together with the guide post 87 which is guided by the bushes 86. On the contrary, if air is drawn out of the cylinder 89, the rod 90 is retracted into the cylinder 89, lowering the guide roller mount plate 47. Thus, the group of guide rollers and the tape pressing mechanism 5 are movable up and down in the opening 6b of the housing 6.

The guide roller mount plate 47 is provided with a level adjusting mechanism thereon for adjusting the guide rollers and the tape pressing mechanism into positions in level with the tape travel position. The level adjusting mechanism includes a level adjusting bolt 93 threaded into a bolt holder member 94, which is fixed to the rear side 6c of the housing 6, and pressed against the main surface 47a of the guide roller mount plate 47 to determine the upper lifted position thereof. The level adjusting bolt 93 is adjustably threaded into a tapped hole in the bolt holder member 94 which is securely fixed to the rear side 6c of the housing 6. It follows that the upper lifted position of the guide roller mount plate 47 can be adjusted by varying the degree of the threaded engagement of the level adjusting bolt 93 with the tapped hole.

When the guide roller mount plate 47 is in a lower dead position, the group of guide rollers and the tape pressing mechanism 5 are held in the respective receded positions clear of the slidable tape drawing mechanism 2.

As shown in FIG. 1, the rotatable substrate holder mechanism 4 which holds and rotates a hard disk substrate is mounted on a base plate 98, in a position confronting substantially a center portion of the main surface 6a of the housing 6. This substrate holder mechanism 4 includes a substrate holder 96 which rigidly holds thereon a substrate 95 to be machined, and a rotational drive (not shown) which rotates the substrate 95 about its axis.

The substrate holder 96 has a disk-like shape and is fixedly mounted on the base plate 98. The substrate holder 96 is centrally provided with a rotational shaft 97 on which the center hole of the hard disk substrate 95 is to be fitted. The rotational shaft 97 is rotated by a rotational drive, for example, by a motor or the like. Therefore, the hard disk substrate which is mounted on the holder 96 is rotated with the rotational shaft 97 about the axis thereof, and moved to the grinding position on the main surface 6a of the housing 6.

The hard disk substrate processing machine with the above-described construction is further provided with a drive apparatus (omitted in the drawings) which moves the processing machine up and down as a whole except the work holder mechanism 4.

Now, the operation by the above-described hard disk substrate grinding machine is explained with reference to FIGS. 5 through 8.

Firstly, as shown particularly in FIG. 5, a cartridge 14 is placed and fixed on the cartridge mount plate 7. More specifically, the cartridge 14 is fixed in position by fitting the positioning pins 8 and the hub drive shafts 9 on the cartridge mount plate 7 into the positioning holes 25 and bladed portion insert holes 27a and 28a on the part of the cartridge 14.

At this time, the loading rollers 33 are located in the notches 22 and 23 of the cartridge 14, and the guide roller mount plate 47 is in the lower dead position holding the respective guide rollers and the tape pressing mechanism 5 in the retracted positions in the opening 6b of the housing 6.

Next, as shown in FIG. 6, the cylinder 38 of the loading roller slide means 35 is actuated to slide along the guide rail 37 the loading roller mount plate 34 which supports the loading rollers 33. As a result, the lapping tape 19 is wrapped around the loading rollers 33 and pulled out of the cartridge 14. Then, the cylinder 38 is operated until the rod connecting member 45 on the loading roller mount plate 34 is pressed against the loading roller positioning member 46. Namely, the lapping tape 19 assumes a predetermined loaded position when the loading rollers 33 are stopped in the outer position by the engagement of the rod connecting member 45 with the roller positioning member 46.

The lapping tape 19 from the supply reel 18 is passed and turned around the paired loading rollers 33, through the third guide roller 69 which is provided on the main surface 6a of the housing 6, and wound up on the take-up reel 17 through the capstan 51 provided likewise on the main surface 6a of the housing 6.

At this point in time, the guide roller mount plate 47 is still in the lower dead position, holding the group of guide rollers and the tape pressing mechanism in the receded or lower positions in the opening 6b of the housing 6.

Figure 7:
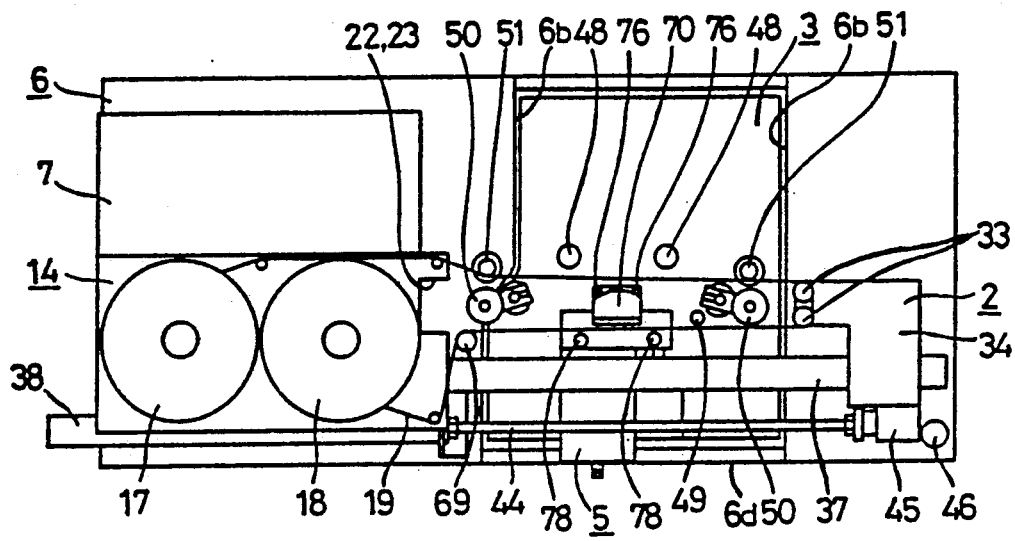
FIG. 7 is a view similar to FIG. 6 but showing a guide roller mount plate in lifted position.

Then, as shown particularly in FIG. 7, the guide rollers and the tape pressing mechanism 5 on the guide roller mount plate 47 are lifted up into the respective upper positions above the main surface 6a of the housing 6 within its opening 6b. Upon reaching the upper positions, the guide roller mount plate 47 is stopped by the level adjusting bolt 93 on the housing 6 which comes into engagement with the bolt stopper portion 92 of the guide roller mount plate 47. Consequently, the group of guide rollers and the tape pressing mechanism 5 are located in the positions in level with the tape travel position.

In this phase of operation, the tape pressing mechanism 5 is in the receded position on the side of the side surface 6d of the housing 6.

Now, the first guide rollers 48 of the group of guide rollers and the capstans 51 are in protruded positions on the outer side or on the grinding side of the lapping tape 19 which has been drawn out as described hereinbefore. On the other hand, the pinch rollers 50 and the second guide roller 49 are in protruded positions between the lapping tape portions to and from the loading rollers. The pinch rollers 50 are turned and held in positions away from the capstans 51 by the pinch roller rocking means 65, and therefore they are kept free of contact with the lapping tape 19.

At the same time, the tape pressing member 70 of the tape pressing mechanism 5 and the guide pins 76 planted on the fore end portion of the pressing portion 73 of the tape pressing member 70 are in protruded positions between the afore-mentioned lapping tape portions, while the guide pins 78 planted on the base portion 74 of the tape pressing member 70 are in protruded positions on the outer side of the lapping tape 19 or on the side away from the grinding position.

In this state, the pinch rollers 50 are turned toward the capstans 51 by the pinch roller rocking means 65, thereby pressing the lapping tape portion on the grinding side against the capstans 51.

Figure 8:
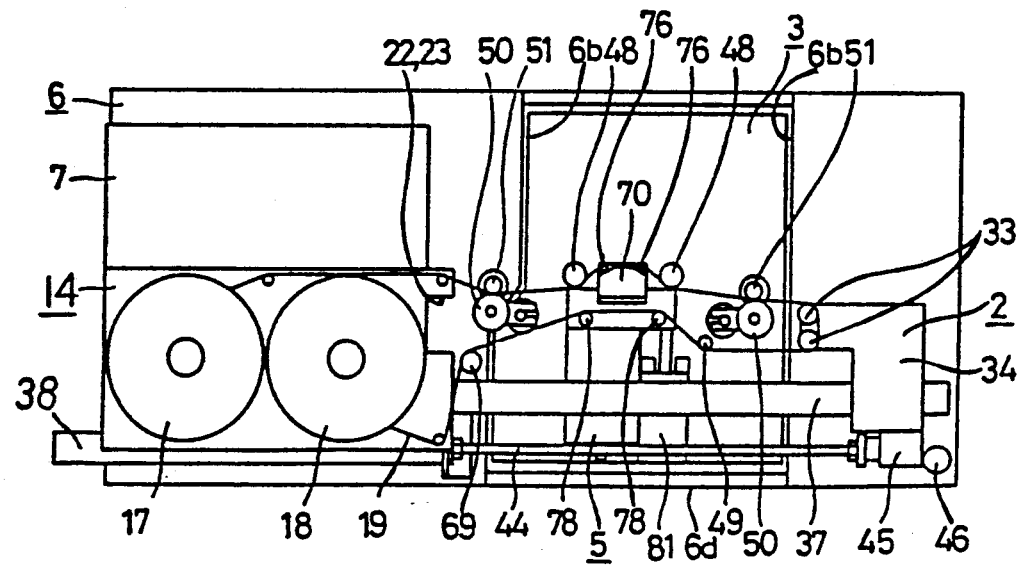
FIG. 8 is a view similar to FIG. 7 but showing a tape pressing member which is pressed against the processing tape.

Next, as shown particularly in FIG. 8, the cylinder 81 is actuated to slide along the guide rail 79 the plate 71 which mounts thereon the tape pressing member 70, shifting the latter into its operating position.

Consequently, the lapping tape portion on the machining side is pulled forward by the guide pins 76 planted on the tape pressing member 70, while the other lapping tape portion is pulled forward by the guide pins 78 planted on the base portion 74 of the tape pressing member 70. The tape pressing member 70 is stopped as soon as the stopper plate 83 on the end face of the mount plate 71 is pushed against the end face of the guide rail 79. The lapping tape 19 is now threaded and set in position as shown in FIG. 8.

After loading the lapping tape 19, the rotational drives for the capstans 51 and the hub of the take-up reel 17 are actuated. Whereupon, the lapping tape 19 which is pressed by the pinch rollers 50 is fed forward. Namely, the lapping tape 19 is fed from the supply reel 18, and transported around the third guide roller 69 planted on the main surface 6a of the housing, the guide pins 78 planted on the base portion 74 of the tape pressing member 70, and the second guide roller 49, and then turned back around the paired loading rollers 33. The lapping tape past the loading rollers 33 is transported between the capstan 51 on the tape-drawing side and the pinch roller 50 and around one of the first guide rollers 48 fixed at the grinding position, one of the guide pins 76 planted on the tape pressing member 70, and the other guide pin 76, the other one of the first guide rollers 48, and then between the capstan 51 and the pinch roller 50 mounted on the side of the cartridge 14.

In the next place, as shown in FIG. 3, the machine as a whole is moved up and down by a driving apparatus (not shown), while the lapping tape 19 is held in position overlapping the surface of the hard disk substrate 95 which is fixed and rotated on the substrate holder 96.

Then, the tape pressing member 70 starts to blow air from its air holes to press the lapping tape 19 on the surface of the hard disk substrate 95 with air blasts of predetermined pressure. Consequently, the surface of the hard disk substrate 95 is processed by the travelling lapping tape 19. During this grinding operation, the machine is as a whole moved up and down to press the lapping tape 19 over the entire surface of the hard disk substrate 95.

Upon completing the grinding of the hard disk substrate 95, the above-described operations are carried out in an inverse order, withdrawing the unreeled lapping tape 19 into the cartridge 14.

More specifically, the air blast from the tape pressing member 70 as well as the rotation of the capstans 51 is stopped. Then, the cylinder 81 of the tape pressing member 70 is actuated to slide back the latter along the guide rail 79 toward the side surface 6d of the housing 6. As a result, the guide pins 76 and 78 on the tape pressing member 70 are disengaged from the lapping tape 19 and returned to the positions shown in FIG. 7.

Next, the pinch roller rocking means 65 is operated in a direction of disengaging the pinch rollers 50 from the capstans 51, thus releasing the lapping tape 19 therefrom. Then, the cylinder 89 which serves for up and down movements of the guide roller mount plate 47 is operated to lower same. By so doing, the group of guide rollers and the tape pressing mechanism 5 on the guide roller mount plate 47 are lowered and retracted into the opening 6b of the housing 6 to assume the positions shown in FIG. 6.

The cylinder 38 of the loading roller sliding means 35 is then operated to slide the loading roller mount plate 34 along the guide rail 37 toward the cartridge 14. Simultaneously, the hub drive shaft 9 for the take-up reel 17 is actuated to wind thereon the lapping tape portion which has been unreeled for the process.

The unreeled lapping tape portion is completely wound on the take-up reel 17 in the cartridge as soon as the loading rollers 33 mounted on the plate 34 are inserted in the notches 22 and 23 in the cartridge 14.

Although the hard disk substrate grinding machine of the present invention has been described by way of a preferred embodiment, it is possible for those skilled in the art to add various alterations or modifications thereto without departing from the scope of the invention as defined in the claims.

For instance, the hard disk substrate processing machine which is arranged to grind one side of a hard disk substrate in the foregoing embodiment may be modified to grind both sides of the substrate by providing counterparts of the cartridge mount 1, tape drawing mechanism 2, guide roller unit 3 and tape pressing mechanism symmetrically on the housing 6. Naturally, further improvements in working efficiency and productivity can be attained by such simultaneous processing of the opposite surfaces of the substrate.

It will be appreciated from the foregoing description that, with the hard disk substrate processing machine according to the invention, the operator is required only to place a processing tape cartridge on the cartridge mounting of the machine, since the processing tape is automatically drawn out from the cartridge and set in a predetermined position by a group of guide rollers.

Thus, the present invention has achieved automation of the lapping tape loading operation, obviating the conventional manual tape setting operation which is very troublesome.

It follows that the operator can set a processing tape in position in an extremely simplified manner without any troublesome manual efforts. Besides, the automation contributes to the improvement of working efficiency of the surface treatment operation, enhancing all the more the productivity of the machine.

What is claimed is:

1. A surface processing machine employing a processing tape cartridge rotatably accommodating in a casing a pair of reels carrying a winding of processing tape, said surface processing machine comprising:
   a cartridge holder for holding said processing tape cartridge fixedly in position on said machine;
   a tape drawing mechanism adapted to draw out part of said processing tape in said cartridge to a predetermined position;
   a guide roller mechanism for setting and transporting said processing tape in a predetermined path of travel through a machining position;
   a work holder mechanism adapted to hold and rotate a work thereon at said machining position;
   a tape pressing mechanism for pressing said processing tape against said work;
   said cartridge holder and tape drawing mechanism being mounted on a main surface of a housing, said guide roller mechanism and said tape pressing mechanism being supported in movable relation within an opening provided in a center portion of said housing, and said work holder being adapted to hold said work opposingly to said machining position, in a center portion on said main surface of the housing; wherein said cartridge holder comprises a cartridge mount plate in level relation with the path of tape travel, positioning pins rigidly located on said housing for securely holding said cartridge thereon, and a pair of hub drive shafts projected through said cartridge mount plate for engagement with hub portions of said tape reels carried by said tape cartridge, said tape cartridge being provided with positioning holes to be fitted on said positioning pins in said cartridge holder.

2. A surface grinding/texturing/burnishing/polishing/wiping machine as defined in claim 1, wherein said tape drawing mechanism comprises a pair of loading rollers, a loading roller mount plate rotatably supporting said loading rollers thereon, and a sliding means for sliding said loading roller mount plate toward and away from said cartridge holder, and said tape cartridge is provided with an indented portion at one of the short sides thereof to receive said loading rollers therein.

3. A surface processing machine as defined in claim 1, wherein said sliding means comprises a guide rail for sliding said loading roller mount plate therealong, and a cylinder for moving said loading roller mount plate to and from a predetermined position on said guide rail.

4. A surface processing machine as defined in claim 1, wherein said guide roller mechanism comprises a group of guide rollers for transporting said lapping tape along said predetermined path of travel, and a guide roller mount plate supporting said group of guide rollers thereon.

5. A surface processing machine as defined in claim 4, wherein said group of guide rollers comprises at least a pair of first guide rollers, a second guide roller, a pair of pinch rollers and a capstan in predetermined positions on said guide roller mount plate.

6. A surface processing machine as defined in claim 5, wherein said first guide rollers are located at a distance from each other on the opposite sides of a grinding position where said work is machined by said lapping tape, said capstan is located on one side of the path of travel of the drawn-out tape advancing toward said grinding position from said loading rollers, and said pinch rollers are located opposingly to said capstan and a second capstan located on one side of the path of travel of said lapping tape moving toward said cartridge past said machining position and swingable toward said capstans to press said lapping tape thereto.

7. A surface processing machine as defined in claim 1, wherein said tape pressing mechanism comprises a tape pressing member for pressing said lapping tape against the surface of said work, a base plate mounting said tape pressing member thereon, and a slider portion for sliding said base plate toward and away from said machining position.

8. A surface processing machine as defined in claim 7, wherein said tape pressing member is provided with a pressing portion having a pair of guide pins mounted on a fore end portion thereof for pressing said lapping tape uniformly against the surface of said work, and a base portion fixedly mounted on said base plate.

9. A surface processing machine as defined in claim 8, wherein said pressing portion is provided with air holes to blow air blasts against said lapping tape in said machining position in a direction perpendicular to the tape face.

10. A surface processing machine as defined in claim 8, wherein said base portion has guide pins planted thereon to guide said lapping tape into a predetermined path of travel.

11. A surface processing machine as defined in claim 8, wherein said slider portion comprises a guide rail, a slide plate slidable on and along said guide rail, and a cylinder for sliding said slide plate toward and away from said machining position.

12. A surface processing machine as defined in claims 4, 5, 6, 7, 8, 9, 10 or 11, wherein said guide roller mount plate mounting said group of guide roller and said tape pressing mechanism is supported on a cylinder and vertically movable between a sunken position within said opening in said housing and a raised position holding said guide rollers and tape pressing mechanism in level with said path of tape travel.

13. A surface processing machine as defined in claim 12, wherein the raised position of said guide roller mount plate is adjustable by way of a level adjusting bolt pressed against on said guide roller mounted plate through a tapped member on the side of said housing.

14. A surface processing machine as defined in claim 1, wherein said work holder mechanism comprises a rotatable work mount portion adapted to rotate said work while holding the surface of said work at said machining position on said housing.

15. A surface processing machine as defined in claims 1, 2, 3, 4, 5, 6, 7, 8, 9, 10, or 14, wherein said machine as a whole is moved vertically up and down during a grinding/texturing/burnishing/polishing/wiping operation except said work holder mechanism.

16. A surface processing machine as defined in claim 1, wherein said work is a hard disk substrate.

17. A surface processing machine employing a processing tape cartridge rotatably accommodating in a casing a pair of reels carrying a winding of processing tape, said surface processing machine comprising:
- a cartridge holder for holding said processing tape cartridge fixedly in position on said machine;
- a tape drawing mechanism adapted to draw out part of said processing tape in said cartridge to a predetermined position;
- a guide roller mechanism for setting and transporting said processing tape in a predetermined path of travel through a machining position;
- a work holder mechanism adapted to hold and rotate a work thereon at said machining position; and
- a tape pressing mechanism for pressing said processing tape against said work, said tape pressing mechanism comprising a tape pressing member for pressing said lapping tape against the surface of said work, a base plate mounting said tape pressing member thereon, and a slider portion for sliding said base plate toward and away from said machining position, said pressing portion being provided with air holes, and means for blowing air blasts against said processing tape in said machining position through said air holes in a direction perpendicular to the tape face.

18. The surface processing machine of claim 17 in which said tape pressing member is provided with a pressing portion having a pair of guide pins mounted on a forward end portion thereof for pressing said lapping tape uniformly against the surface of said work, and a base portion fixedly mounted on said base plate, said base portion having guide pins carried thereon to guide said lapping tape into a predetermined path of travel.

19. The surface processing machine of claim 18 in which said machine is as a whole is moved vertically up and down during said surface processing operation relative to said work holder mechanism.

20. A surface processing machine employing a processing tape cartridge rotatably accommodating in a casing a pair of reels carrying a winding of processing tape, said surface processing machine comprising:
- a cartridge holder for holding said processing tape cartridge fixedly in position on said machine;
- a tape drawing mechanism adapted to draw out part of said processing tape in said cartridge to a predetermined position;
- a guide roller mechanism for setting and transporting said processing tape in a predetermined path of travel through a machining position;
- a work holder mechanism adapted to hold and rotate a work thereon at said machining position; and
- a tape pressing mechanism for pressing said processing tape against said work;
- said tape drawing mechanism comprising a pair of loading rollers, a loading roller amount plate rotatably supporting said loading rollers thereon, and a sliding means for sliding said loading roller mount plate toward and away from said cartridge holder, said tape cartridge being provided with an indented portion to receive said loading rollers therein.

21. The surface processing machine of claim 20 in which said tape pressing mechanism comprises a tape pressing member for pressing said processing tape against the surface of said work, a base plate mounting said tape pressing member thereon, and a slider portion for sliding said base plate toward and away from said machining position.

22. The surface processing machine of claim 21 in which said tape pressing member is provided with a pressing portion having a pair of guide pins mounted on a front end portion thereof for pressing said lapping tape uniformly against the surface of said work, and a base portion fixedly mounted on said base plate.

23. The surface processing machine of claim 21 in which said pressing portion is provided with air holes and means to blow air blasts through said holes against said processing tape in said machining position in a direction perpendicular to the tape face.

24. The surface processing machine of claim 21 in which said base portion has guide pins carried thereon to guide said processing tape into a predetermined path of travel.

25. The surface processing machine of claim 20 wherein said sliding means comprises a guide rail for sliding said loading roller mount plate therealong, and power means for moving said loading roller mount plate to and from a predetermined position on said guide rail.

* * * * *